C. E. SOMERS.
MILKING MACHINE.
APPLICATION FILED FEB. 19, 1917.
1,259,309.
Patented Mar. 12, 1918.
2 SHEETS—SHEET 1.
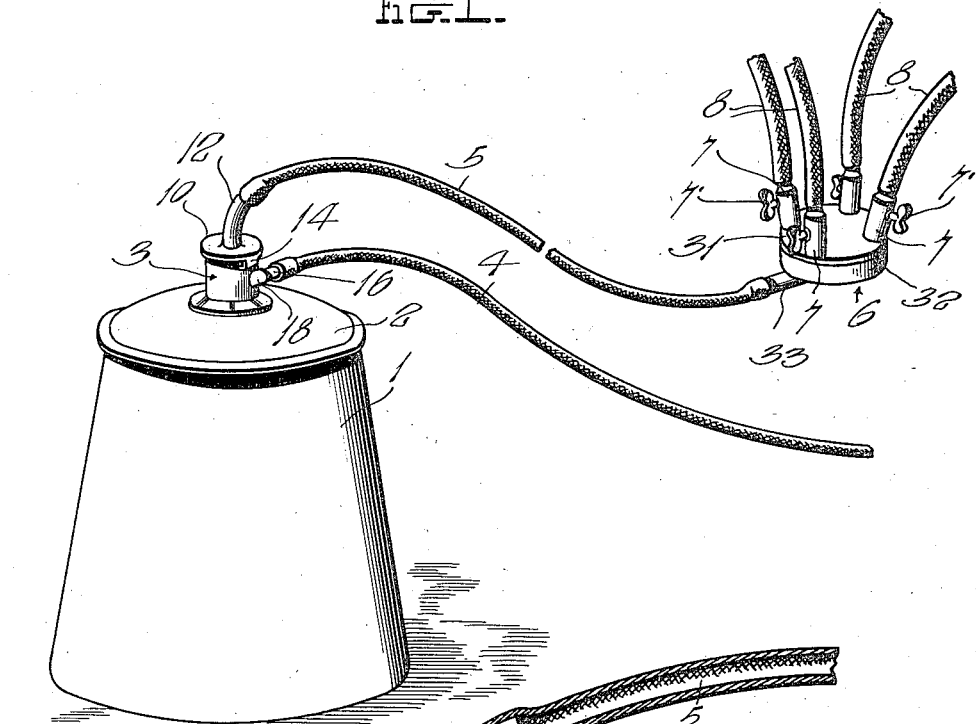
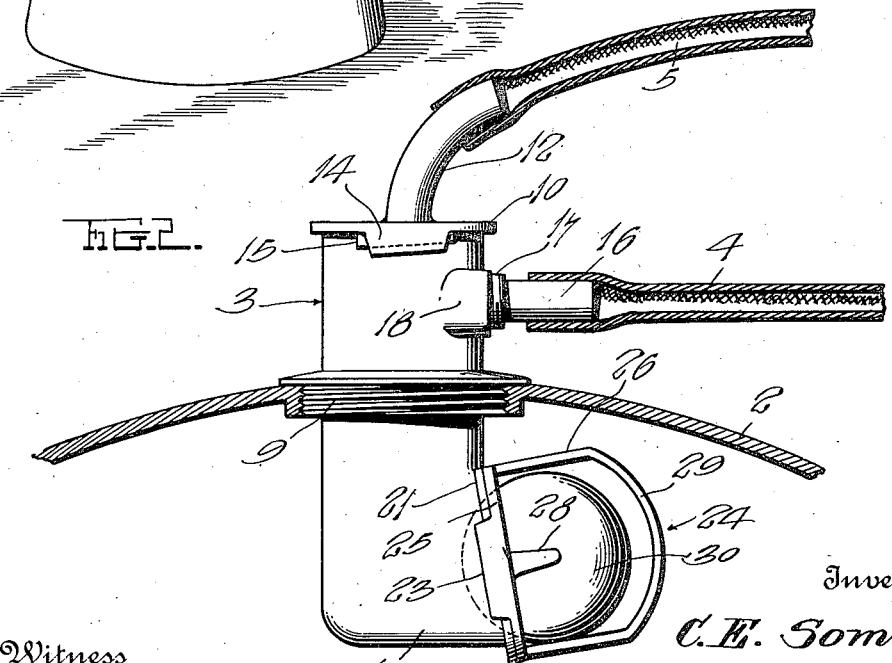
Witness
H. Woodard
Inventor
C. E. Somers
By H. B. Williamson & Co.
Attorneys

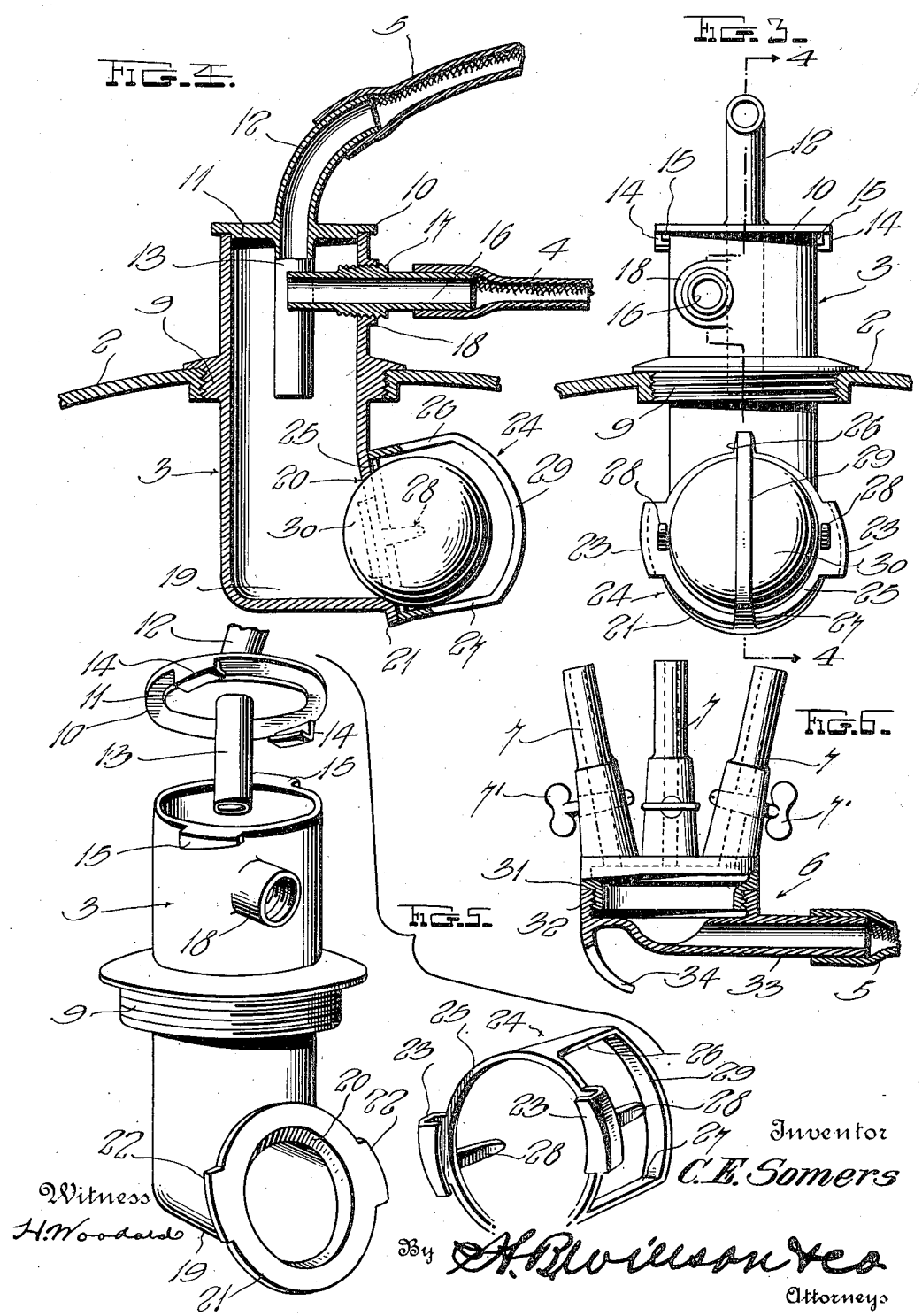

UNITED STATES PATENT OFFICE.

CHARLES E. SOMERS, OF MILWAUKEE, WISCONSIN.

MILKING-MACHINE.

1,259,309.  Specification of Letters Patent.  Patented Mar. 12, 1918.

Application filed February 19, 1917. Serial No. 149,554.

*To all whom it may concern:*

Be it known that I, CHARLES E. SOMERS, a citizen of the United States, residing at Milwaukee, in the county of Milwaukee and State of Wisconsin, have invented certain new and useful Improvements in Milking-Machines; and I do declare the following to be a full, clear, and exact description of the invention, such as will enable others skilled in the art to which it appertains to make and use the same.

My invention has for its principal object to improve upon the general construction of milking machines of the type employing a suction pump for successively creating a vacuum in a vacuum chamber carried by a milk pail or the like, and the invention aims to so construct said vacuum chamber and the valve thereof as to permit quick and easy disassembling in order that the parts may be thoroughly cleaned and sterilized.

Another object is to provide a series of valves whereby suction may be prevented in any one of the four teat cups and by this means injury to the cow is often prevented.

With the foregoing general objects in view, the invention resides in certain novel features of construction and unique combinations of parts to be hereinafter fully described and claimed, the descriptive matter being supplemented by the accompanying drawings which constitute a part of this application and in which:

Figure 1 is a perspective view of the improved features of the machine;

Fig. 2 is a vertical section through the top of the milk pail, showing the vacuum chamber in side elevation;

Fig. 3 is a view of said chamber at right angles to Fig. 2;

Fig. 4 is a vertical section on the plane of the line 4—4 of Fig. 3;

Fig. 5 is a disassembled perspective view of the vacuum chamber;

Fig. 6 is a side elevation, partly in section, of the suction head.

In the drawings above briefly described, the numeral 1 has reference to a milk pail of any suitable size and shape having a removable top 2 carrying the vacuum chamber 3. A suction tube 4 leads from the chamber 3 to a suitable suction pump not shown while another tube 5 leads to said chamber from a suction head 6. The head 6 is equipped with nipples 7 from which tubes 8 extend to the usual teat cups (not shown). The pump creates suction at spaced intervals through the apparatus and thus draws the milk from the cow's bag and discharges it into the pail 1. To prevent injury to the cow when any teat has been milked dry, each of the nipples 7 is provided with a cut off valve 7'. The provision of these valves obviates the necessity of bending the tubes 8 to stop the suction as is now the common practice and thus the life of the tubes is prolonged.

The valve chamber 3 is in the form of a vertically disposed cylinder having an externally threaded collar 9 between its ends tapped into the top 2 of the pail 1 so that it may be readily detached. The upper end of the chamber 3 is closed by a cap 10 having a plug-like portion 11 on its lower side fitting snugly into said chamber, said cap having formed integrally with its upper side a curved nipple 12 to which the tube 5 is connected while another nipple 13 registers with said nipple 12 and is formed integrally with the lower side of the cap to extend a suitable distance into the chamber 3. L-shaped flanges 14 are cast on and depend from the edge of the cap 10 at diametrically opposite points and receive therein tapered ribs 15 formed on the upper end of the chamber 3. It is the office of these parts to normally hold the cap in operative position upon the chamber but to permit quick detachment of said cap by giving it a fraction of a turn in the proper direction. Access is thus had into the interior of the chamber 3 for cleaning the same and when the tube 5 is removed, the cap and the nipples 12 and 13 are easily cleansed.

The suction tube 4 may be connected with the chamber 3 in any preferred manner but the end of said tube preferably fits over the outer end of a horizontal tubular nipple 16 provided with a tapered externally threaded plug 17 which taps into an eccentrically located boss 18 formed on the exterior of the chamber 3. This construction permits the nipple 16 to be readily detached when required and thus cleaning of said nipple as well as the chamber 3 is facilitated.

The lower end of chamber 3 is in somewhat the form of an elbow as shown at 19 and the outer end of said elbow is formed with an internal valve seat 20 and an external annular flange 21 from which a pair of tapered lugs 22 project at diametrically opposite points. By means of the lugs 22 and L-shaped flanges 23, a valve cage 24 is detachably connected to the elbow 19, the outer end of this elbow being inclined as shown so that the cage assumes a slightly inclined position.

The flanges 23 are formed at diametrically opposite points on a metal ring 25 at one end of the cage 24, said ring being joined integrally to the inner ends of upper and lower inclined arms 26 and 27 and a pair of fingers 28, the outer ends of said arms being joined by a curved cross bar 29. A one-piece ball 30 which coöperates with the seat 20 and is contained in the cage 24, is guided in its movement by the arms 26—27 and the fingers 28 and rolls upon said bar 27 as shown clearly in Fig. 4, the inclination of said bar serving to direct said ball at all times toward its seat 20 so that the action of the suction tube 4 in the chamber 3 will produce suction through the inlet 5 to draw milk into said chamber. Then, when the suction is momentarily released, the weight of the liquid will unseat the ball 30 and flow into the pail 1.

By giving the cage 24 a fraction of a turn, the flanges 23 thereof are released and the lugs 22 and said cage may then be detached for cleaning purposes, the ring 25 being greater in diameter than the ball 30 so that the latter may be also removed.

By constructing the several parts of the vacuum chamber 30 as shown and described, the device may be kept in a much more sanitary condition than similar apparatuses now on the market, yet regardless of the fact that practically all parts are detachably connected, the joints will be substantially fluid and air tight due to the provision of the flanges 14 and 23 and the tapered ribs 15 and 22. This sectional construction therefore constitutes a highly important feature of the invention and particular stress is also laid upon the inclined valve cage 24, the seat 20 at the lower end thereof, and the ball valve 30 removably held in the cage and caused to engage its seat by the inclination of said cage.

To further aid in cleaning the entire apparatus, the suction head 6 is by preference formed of upper and lower sections 31 and 32 threaded together, said upper section carrying the nipples 7 whereas the lower section is provided with a nipple 33 by means of which the tube 5 is connected thereto, said lower section also having a hook 34 by means of which it may be supported from a part of a stanchion or stall.

From the foregoing, taken in connection with the accompanying drawings, it will be observed that although the invention is of simple and inexpensive construction, it will be highly advantageous and efficient and on account of the desirable features involved, the arrangement of parts illustrated and described is preferable. It is to be understood, however, that within the scope of the invention as claimed, numerous changes may be made without sacrificing the principal advantages.

I claim:

1. In a milking apparatus, the combination of a vacuum chamber having in its side an annular valve seat and having on diametrically opposite sides of said seat a pair of outstanding lugs, a ball valve on the exterior of the chamber coöperating with said seat, a ring having angular flanges detachably engaging said lugs, upper and lower arms extending outwardly from said ring and connected by a cross bar, and fingers also extending from said ring, said arms, cross bar and fingers serving to movably receive said ball therein and said ring being of a size to permit removal of said ball when the former is detached.

2. In a milking apparatus, the combination of a vertically disposed vacuum chamber having its lower end in substantially the form of an elbow with the open end of the latter inclined upwardly and inwardly and formed with an internal circular valve seat, said end of the elbow having outstanding lugs adjacent diametrically opposite sides of said seat, a ball valve on the exterior of the chamber and coöperating with said seat, a ring contacting with said open end of the elbow and having angular flanges detachably engaging said lugs, and ball guiding arms extending outwardly from said ring to form a cage for said ball valve, the lowermost of said arms being inclined to normally cause said valve to roll toward its seat.

3. In a milking apparatus, the combination of a vacuum chamber having means for creating suction therein and means for permitting the discharge of milk, a cap for the upper end of said chamber having depending angular flanges at diametrically opposite points, outstanding lugs on said chamber with which said flanges are detachably engaged to secure the cap in place, and upper and lower registering nipples formed integrally with said cap and disposed respectively on the exterior and interior of the chamber.

4. In a milking apparatus, the combination of a vertically disposed vacuum chamber having its lower end in substantially the form of an elbow with the open end of the latter inclined upwardly and inwardly and formed with an internal circular valve seat, said end of the elbow having outstanding lugs adjacent diametrically opposite sides of said seat, a ball valve on the exterior of the chamber and coöperating with said seat, a ring contacting with said open end of the elbow and having means detachably engaging said lugs, and ball guiding arms extending outwardly from said ring to form a cage for said ball valve, the lowermost of said arms being inclined to normally cause said valve to roll toward its seat.

In testimony whereof I have hereunto set my hand in the presence of two subscribing witnesses.

CHARLES E. SOMERS.

Witnesses:
A. G. LANGLOIS,
F. G. LANCE.